(12) United States Patent
Imai et al.

(10) Patent No.: US 9,037,749 B2
(45) Date of Patent: May 19, 2015

(54) INFORMATION PROCESSING APPARATUS AND IMAGE TRANSMISSION METHOD

(71) Applicant: Fujitsu Limited, Kawasaki-shi (JP)

(72) Inventors: Tomoharu Imai, Kawasaki (JP); Kazuki Matsui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 220 days.

(21) Appl. No.: 13/709,135

(22) Filed: Dec. 10, 2012

(65) Prior Publication Data

US 2013/0262705 A1    Oct. 3, 2013

(30) Foreign Application Priority Data

Mar. 30, 2012 (JP) ................................. 2012-083174

(51) Int. Cl.
| | | |
|---|---|---|
| G06F 15/16 | (2006.01) | |
| H04L 29/06 | (2006.01) | |
| H04N 19/39 | (2014.01) | |
| H04N 19/65 | (2014.01) | |
| H04N 19/174 | (2014.01) | |
| H04N 19/167 | (2014.01) | |
| H04N 19/169 | (2014.01) | |

(52) U.S. Cl.
CPC ............ *H04L 65/602* (2013.01); *H04N 19/174* (2014.11); *H04N 19/39* (2014.11); *H04N 19/65* (2014.11); *H04N 19/167* (2014.11); *H04N 19/188* (2014.11)

(58) Field of Classification Search
CPC ........... H04L 65/602; H04N 19/00248; H04N 19/00272
USPC ........................... 709/246, 247; 382/232, 235
See application file for complete search history.

(56) References Cited

U.S. PATENT DOCUMENTS

| | | | | |
|---|---|---|---|---|
| 7,769,083 | B2 * | 8/2010 | Maeda et al. ............ | 375/240.02 |
| 7,941,825 | B2 | 5/2011 | Park et al. | |
| 2007/0098082 | A1 * | 5/2007 | Maeda et al. ............ | 375/240.26 |
| 2008/0063078 | A1 | 3/2008 | Futenma et al. | |
| 2009/0016566 | A1 * | 1/2009 | Goto et al. ..................... | 382/100 |
| 2011/0252326 | A1 * | 10/2011 | Asano ........................... | 715/736 |
| 2013/0182770 | A1 * | 7/2013 | Kondo ..................... | 375/240.16 |

FOREIGN PATENT DOCUMENTS

| | | | |
|---|---|---|---|
| JP | 2008-028541 | | 2/2008 |
| JP | 2008-535441 | | 8/2008 |
| JP | 2009100259 A | * | 5/2009 |
| WO | WO-2007/066905 | | 6/2007 |

* cited by examiner

*Primary Examiner* — Mohamed Wasel
(74) *Attorney, Agent, or Firm* — Fujitsu Patent Center

(57) ABSTRACT

An information processing apparatus includes rendering a software processing result to an image memory that stores a image to be displayed on a terminal apparatus connected through a network, and includes detecting an update field in which the image is updated, when the rendering with respect to the image memory is performed, and includes first compressing the image of the update field to obtain first compression data, and includes dividing the first compression data into a data size within a window size of a connection established with the terminal apparatus to obtain division data, and includes second compressing the image of the update field to the data size within the window size of the connection to obtain second compression data, and includes assigning each division data to any connection of multiple connections and assigning the second compression data to a dedicated connection different from the multiple connections.

6 Claims, 8 Drawing Sheets

INFORMATION PROCESSING APPARATUS AND IMAGE TRANSMISSION METHOD

CROSS-REFERENCE TO RELATED APPLICATION

This application is based upon and claims the benefit of priority of the prior Japanese Patent Application No. 2012-083174, filed on Mar. 30, 2012, the entire contents of which are incorporated herein by reference.

FIELD

The embodiments discussed herein are related to an information processing apparatus, an image transmission method and a recording medium.

BACKGROUND

There is known a system called "thin client". In the thin client system, the system is configured such that only the minimum function is assigned to a client and a server manages resources such as an application and a file.

Such a thin client system displays a processing result of processing performed actually in a server and data held by the server to a client, while acting as if the client subjectively performs the processing and holds the data.

As an example, the thin client system causes the server to execute an application related to documentation or email and display a processing result of the application to the client. In addition to such a business application, for example, an application to process a high-resolution image such as a CAD (Computer Aided Design) and further an application to process motion pictures are enhanced as an applicable scope of the thin client system.

Also, as the performance of a mobile terminal becomes high, there is a growing need for connecting not only a desktop PC (Personal Computer) but also a mobile terminal such as a notebook PC and tablet terminal to the thin client system as a client.

However, compared to a LAN (Local Area Network), in a communication network in which the mobile terminal is available, the communication environment rapidly changes and the delay or packet loss is likely to occur, and therefore there may be a case where the rendering delay occurs due to the data transmission delay between the client and the server.

As a technique example of reducing such transmission delay, there is the following information processing apparatus. In this information processing apparatus, after an image is compressed in precinct units corresponding to a compression unit at the time of using wavelet transform, each precinct is separated and accumulated every same frequency component band. Besides, the information processing apparatus packetizes the accumulated image data in order from the low frequency component and outputs the result to a network. By this means, compared to the case of transmitting data in precinct units, it is intended to suppress the degradation of image quality in the case of an occurrence of packet loss and perform transmission with low delay.

Patent Literature 1: Japanese Laid-open Patent Publication No. 2008-28541

However, the aforementioned technique is only effective in a specific-codec-dependent environment.

That is, although the above information processing apparatus transforms one image data into a structure in which it is possible to render the data from the low frequency component to the high frequency component in a phased manner, such conversion is not performed without wavelet transform. Therefore, the above information processing apparatus is applicable only to a specific codec using the wavelet conversion and is not applicable to other codecs.

Also, the above problem is a common problem in a case where the thin client system transmits large volumes of data at the time of screen updating, and is not caused only in a case where an application operating on a server processes an image or motion picture.

SUMMARY

According to an aspect of an embodiment, an information processing apparatus includes: an image memory that stores an image to be displayed on a terminal apparatus that is connected through a network; and a processor coupled to the image memory. The processor executes a process including: rendering a software processing result to the image memory; detecting an update field in which the image is updated, when the rendering with respect to the image memory is performed; first compressing the image of the update field to obtain first compression data; dividing the first compression data into a data size within a window size of a connection established with the terminal apparatus to obtain division data; second compressing the image of the update field to the data size within the window size of the connection to obtain second compression data; and assigning each division data to any connection of multiple connections and assigning the second compression data to a dedicated connection different from the multiple connections.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. Here, these embodiments do not limit the techniques of the disclosure. Also, it is possible to adequately combine the embodiments within a range in which processing content is not contradictory.

[a] First Embodiment

System Configuration

Figure 1:
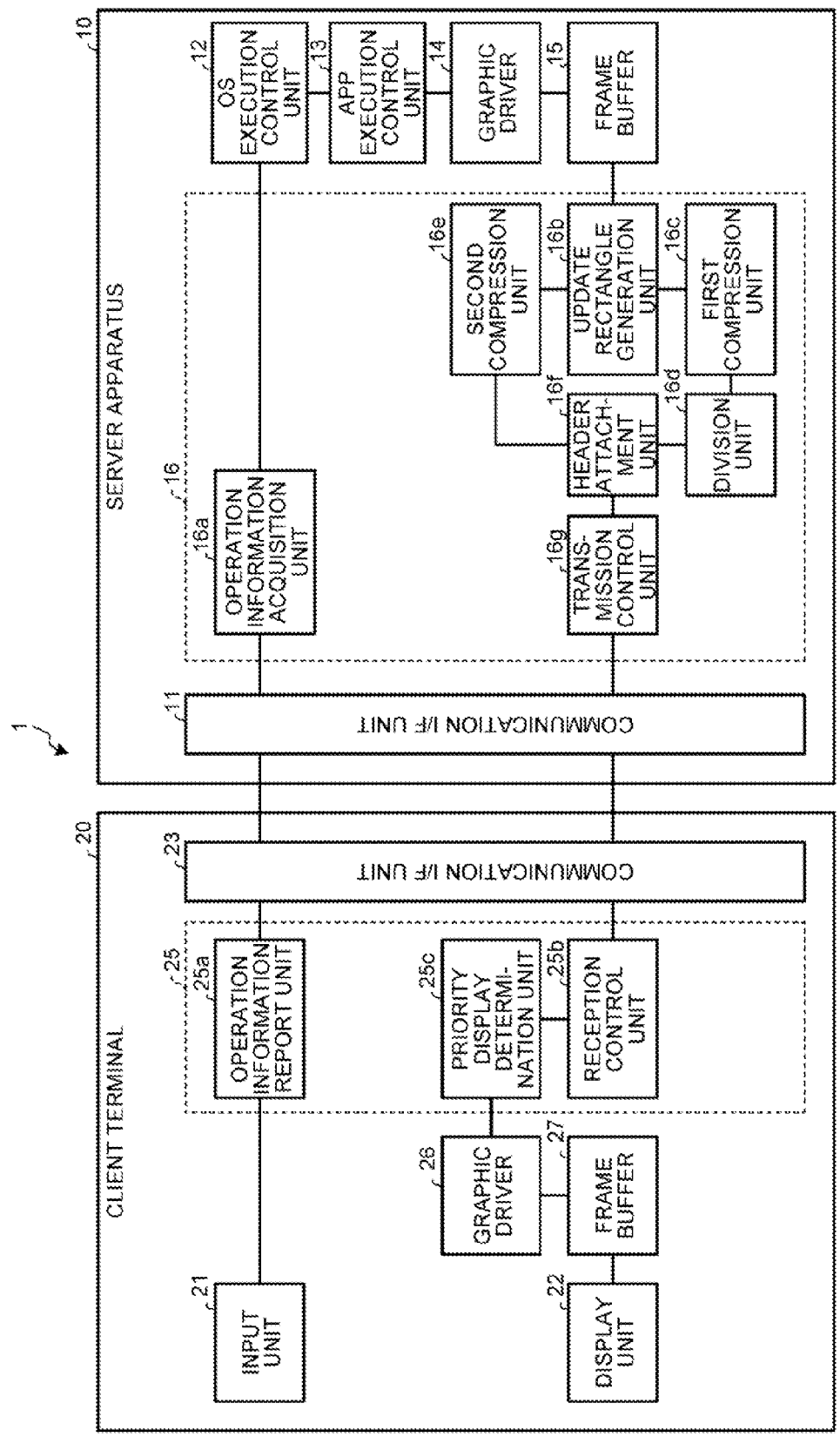
FIG. 1 is a block diagram illustrating the functional configuration of each apparatus included in a thin client system according to a first embodiment.

First, a configuration of a thin client system according to the present embodiment will be explained. FIG. 1 is a block diagram illustrating the functional configuration of each apparatus included in the thin client system according to a first embodiment.

A thin client system 1 illustrated in FIG. 1 causes a server apparatus 10 to remotely control the desktop displayed by a client terminal 20. That is, the thin client system 1 displays a result of processing performed actually in the server apparatus 10 and held data to the client terminal 20, while acting as if the client terminal 20 subjectively performs the processing and holds the data.

As illustrated in FIG. 1, the thin client system 1 includes the server apparatus 10 and the client terminal 20. Also, in the example of FIG. 1, although a case is illustrated where one client terminal 20 is connected to one server apparatus 10, it is equally applicable to a case where it is connected to an arbitrary number of client terminals.

These server apparatus 10 and client terminal 20 are connected to each other via a predetermined network such that communication is possible. Such a network is not limited to the Internet, a LAN (Local Area Network) and a network for fixed terminals such as a VPN (Virtual Private Network), regardless of wired and wireless networks. For example, the network can adopt a communication network for mobile terminals such as a WAN (Wide Area Network) and WiMAX (Worldwide Interoperability for Microwave Access). Also, as an example of a communication protocol between the server apparatus 10 and the client terminal 20, a case is assumed where an RFB (Remote Frame Buffer) protocol in VNC (Virtual Network Computing) is adopted.

The server apparatus 10 is a computer to provide a service to remotely control a screen displayed on the client terminal 20. In such the server apparatus 10, a remote screen control application for the server is installed or preinstalled. Also, in the following, the remote screen control application for the server may be referred to as "server-side remote screen control app". For example, the server apparatus 10 may mount the server-side remote screen control app as an installed Web server or as a cloud to provide a remote screen control service by outsourcing.

As an example, the above server-side remote screen control app has a function of providing a remote screen control service. As an aspect, the server-side remote screen control app acquires operation information in the client terminal 20 and causes an application operating in the subject apparatus to perform processing requested by the operation. Subsequently, the server-side remote screen control app generates a screen to display a result of processing performed by the application and transmits the screen to the client terminal 20. At this time, the server-side remote screen control app transmits a field collecting pixels of a different part from a bitmap image displayed on the client terminal 20 before the current screen generation, that is, an update rectangle image. Also, in the following, as an example, a case will be explained where an image of the updating part is formed with a rectangular image, the disclosed apparatus is equally applicable to a case where the image of the updating part is formed in other shapes than the rectangle.

The client terminal 20 is a computer on the side on which the remote screen control service is provided by the server apparatus 10. Examples of the client terminal 20 include a fixed terminal such as a personal computer. As another example, in addition to a notebook personal computer, it is possible to adopt mobile terminals including a mobile terminal such as a mobile phone and PHS (Personal Handyphone System), and a tablet terminal such as a PDA (Personal Digital Assistant).

In the client terminal 20, a remote screen control application for clients is installed or preinstalled. Also, in the following, the remote screen control application for clients may be referred to as "client-side remote screen control app".

The above client-side remote screen control app has a function of reporting, to the server apparatus 10, operation information received via various input devices such as a mouse and keyboard. As an example, the client-side remote screen control app reports, as operation information, the right and left clicks, double click and drag by the mouse or the mouse cursor movement amount acquired by mouse movement operations. Other examples include reporting, as operation information, the mouse wheel rotation amount or a pressed key type in a keyboard. Here, although a case is illustrated where the mouse operation information is acquired, the input device is not limited to the mouse. For example, in a case where a touch panel is mounted, operation information such as a tap and flic performed on the touch panel may be acquired. Also, it may report information acquired by a sensor that can sense a user peripheral state and a user operation to a terminal, such as an acceleration sensor, an optical sensor, a geomagnetic sensor and a temperature sensor, as operation information.

Further, the client-side remote screen control app has a function of causing a predetermined display unit to display an image received from the server apparatus 10. As an aspect, in the case of receiving the update rectangle image from the server apparatus 10, the client-side remote screen control app displays the update rectangle image on a position in which a change is made from the previous desktop.

Here, the server apparatus 10 according to the present embodiment renders a software processing result for an image memory storing a display image displayed on the client terminal 20. Further, in a case where the rendering with respect to the image memory is performed, the server apparatus 10 according to the present embodiment detects that the image updating is performed. Further, the server apparatus 10 according to the present embodiment compresses the update rectangle image and divides the compression data of the update rectangle image into data of a data size within a window size of connection established with the client terminal 20. Also, the server apparatus 10 according to the present embodiment compresses the update rectangle image in the data size within the connection window size. On that basis, the server apparatus 10 according to the present embodiment assigns each division data acquired by dividing the compression data of the update rectangle image, to any connection of multiple connections. Meanwhile, the server apparatus 10 according to the present embodiment assigns the update rectangle image compression data compressed in a data size within a window size, to a dedicated connection different from the multiple connections.

Thus, the server apparatus 10 according to the present embodiment transmits the same update rectangle image to the client terminal 20 in an overlapping manner using a path via the multiple connections and a path via the dedicated connection different from the multiple connections. At this time, the update rectangle images transmitted from each path to the client terminal 20 are identical but have different image compression rates.

Among these, the division data of the update rectangle image is transmitted in parallel to the client terminal 20 via the multiple connections. In this case, even if the data size of the update rectangle image is large, by increasing the number of connections sufficiently, it is possible to transmit large quantities of data at one time without a confirmatory response such as ACK (ACKnowledgement). Therefore, the update rectangle image transmitted via the multiple connections does not require an excessive compression. While such a merit is acquired, the division data transmitted to the client terminal 20 via the multiple connections is not rendered on the side of the client terminal 20 until all data is collected. That is, when the packet loss occurs in any division data, the update rectangle image is not rendered on the side of the client terminal 20 until the division data in which the packet loss occurred is retransmitted.

In preparation for such a case, the server apparatus 10 according to the present embodiment transmits the update rectangle image compression data, which is compressed in the data size within the connection window size, to the client terminal 20 via the dedicated connection. In the case of going through such the dedicated connection, there is no waiting time with other data. Therefore, as long as the compression data of the update rectangle image is reached via the dedicated connection, if the packet loss occurs in any of the division data, it is possible to render the update rectangle image compression data for the client terminal 20 without waiting for the retransmission. Also, if all division data is collected, since the update rectangle image compression data divided and transmitted via the multiple connections has higher image quality than that of the compression data compressed within the connection window size via the dedicated connection, the former data is rendered.

Here, in the following, meaning that the update rectangle image compression data compressed in a data size within the connection window size has lower image quality than that of the update rectangle image compression data transmitted via the multiple connections, the former data may be referred to as "low-image-quality screen data". Also, in the following, meaning that the update rectangle image compression data transmitted via the multiple connections has higher image quality than that of the low-image-quality screen data, the former data may be referred to as "high-image-quality screen data".

Figure 2:
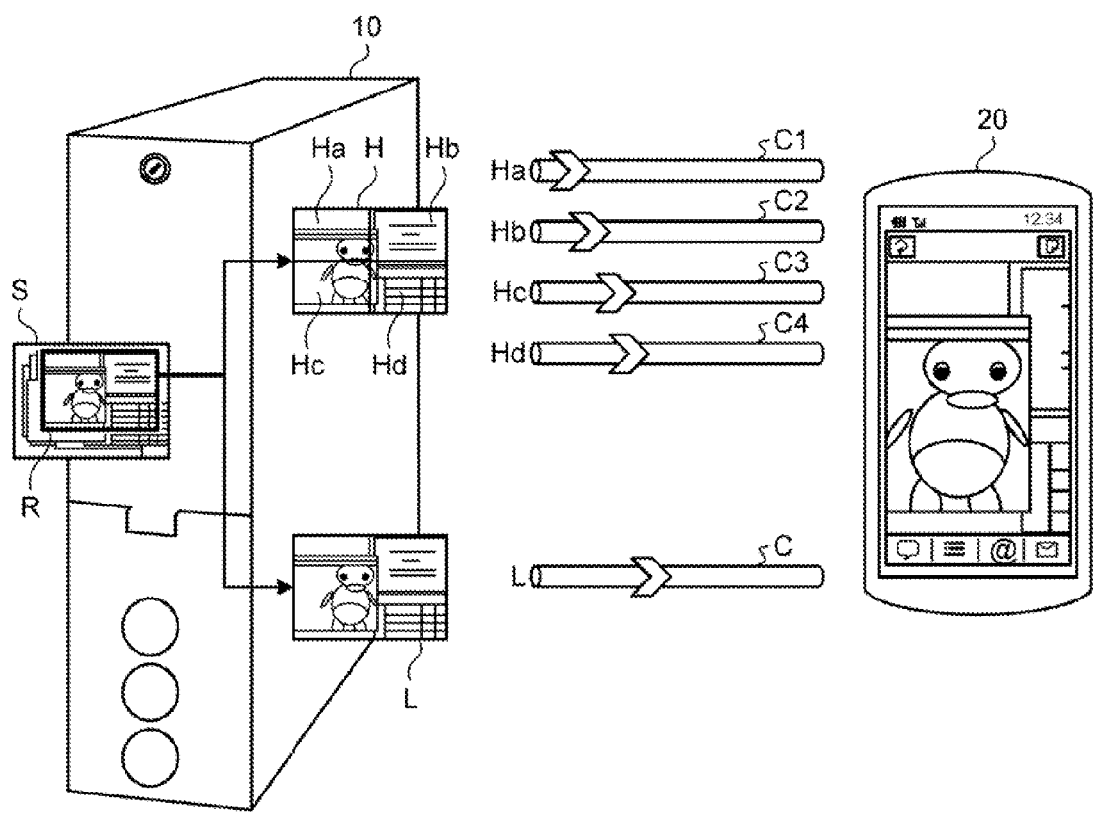
FIG. 2 is a view for explaining a method of using multiple connections established between a server apparatus and a client terminal according to the first embodiment.

FIG. 2 is a view for explaining a method of using multiple connections established between the server apparatus and the client terminal according to the first embodiment. In the example of FIG. 2, five connections including multiple connections C1 to C4 and a dedicated connection C are established between the server apparatus 10 and the client terminal 20. Also, although the example of FIG. 2 exemplifies five connections, the connection number is not limited to the illustrated number and it is possible to establish an arbitrary number of connections.

As illustrated in FIG. 2, in the case of detecting a field in which an image of an update rectangle R is updated in a desktop S, the server apparatus 10 generates high-image-quality screen data H by compressing the image of the update rectangle R. Further, the server apparatus 10 divides the above generated high-image-quality screen data H into four items of division data Ha to Hd. While generating these four items of division data Ha to Hd, the server apparatus 10 generates low-image-quality screen data L by compressing the image of the update rectangle R in a data size within a connection window size. In the generation of these high-image-quality screen data H and low-image-quality screen data L, it is possible to adopt an arbitrary codec as long as it is possible to acquire a desired compression rate, and therefore a specific codec is not depended on.

On that basis, among the multiple connections, the server apparatus 10 assigns the division data Ha to the connection C1, assigns the division data Hb to the connection C2, assigns the division data Hc to the connection C3 and assigns the division data Hd to the connection C4. Meanwhile, the server apparatus 10 assigns the low-image-quality screen data L to the dedicated connection C. As a result, the division data Ha is transmitted to the client terminal 20 via the connection C1. Further, the division data Hb is transmitted to the client terminal 20 via the connection C2. Further, the division data Hc is transmitted to the client terminal 20 via the connection C3. Further, the division data Hd is transmitted to the client terminal 20 via the connection C4.

Thus, the division data Ha to the division data Hd are transmitted in parallel to the client terminal 20 via the four connections C1 to C4. Therefore, compared to the case of transmitting an update rectangle image using one connection, it is possible to suppress the data transmission delay between the client and the server.

Further, in a case where the packet loss does not occur in four items of division data Ha to Hd, it is possible to render the high-image-quality screen data H for the client terminal 20. In this case, even in a case where data of a large data size is transmitted from the server apparatus 10 to the client terminal 20, it is possible to browse the desktop of high quality in the client terminal 20.

Further, even if the packet loss occurs in any of the division data Ha to Hd, as long as the low-image-quality screen data L is reached, it is possible to render the low-image-quality screen data L for the client terminal 20 without waiting for the arrival of the division data in which the packet loss occurred. In this case, although the image quality degrades compared to the high-quality-image screen data H, it is possible to prevent the update rectangle image from being undelivered and suppress an occurrence of transmission delay. Therefore, it is possible to respond to an operation performed in the client terminal 20 and, as a result, it is possible to suppress the degradation of operation response.

Therefore, with the server apparatus 10 according to the present embodiment, it is possible to suppress the image degradation and transmission delay without depending on a specific codec.

Configuration of Server Apparatus 10

Next, a functional configuration of the server apparatus 10 according to the present embodiment will be explained. As illustrate in FIG. 1, the server apparatus 10 includes a communication I/F (interface) unit 11, an OS execution control unit 12, an app execution control unit 13, a graphic driver 14, a frame buffer 15 and a remote screen control unit 16. Also, in addition to the functional units illustrated in FIG. 1, the server apparatus 10 includes various functional units held by a known computer, for example, functions such as various input devices and display devices.

The communication I/F unit 11 denotes an interface to perform communication control for a different apparatus such as the client terminal 20. As an aspect of such the communication I/F unit 11, it is possible to adopt a network interface card such as a LAN card.

As an aspect, the communication I/F unit 11 has a function of transmitting/receiving image data to be transmitted to the client terminal 20 and operation information to be transmitted from the client terminal 20. For example, the communication I/F unit 11 establishes and maintains a plurality of TCP (Transmission Control Protocol) connections called "multiple connections" with a communication I/F unit 23 of the client terminal 20. Thus, under the environment in which the multiple connections are maintained, the communication I/F unit 11 performs transmission of image data in a connection designated by a transmission control unit 16g which is described later. Thus, it is possible to improve the data transmission amount by using the plurality of TCP connections.

In the above TCP, at the time of the connection establishment, a buffer size called "window," that is, a so-called window size is transferred between the server apparatus 10 and the client terminal 20. By such transmission of the window size, an apparatus on the side of data transmission can operate the amount of data that can be transmitted within a range of the window size, without a confirmatory response such as ACK. In a case where there is no confirmatory response from an apparatus on the side of data reception, the apparatus on the data transmission side does not transmit data until the confirmatory response is received and the window size is expanded. As an example, here, a case is assumed where the window size is "64 Kbyte", and reasons for enabling the improvement of the data transmission amount by using the plurality of TCP connections will be explained.

Here, in a network for fixed terminals such as a LAN environment, the above window size is not a cause of decreasing the data transmission amount per TCP connection. This is because, since the round trip time (hereinafter referred to as "RTT") between the server and the client is small in the LAN environment, a confirmatory response is received from the client and the window size is continuously expanded in a shorter time than a time taken to perform data transmission of the window size on the transmission side. However, in a network for mobile terminals such as a WAN environment in which the RTT is larger than in the LAN environment, the transfer amount of data that can be transmitted per TCP connection is restricted due to the window size restriction. For example, in the case of a network in which the RTT is "50 msec", since only data of "64 Kbyte" is transmitted for "50 msec", it is found that only transmission of "1280 Kbyte 10 Mbps" is possible per connection for one second. Also, since the window size is a parameter assigned every TCP connection, in the case of the present conditions, it is possible to transfer data of "10 Mbps" every connection by using the plurality of TCP connections. Therefore, by using the plurality of TCP connections even in an environment of a large RTT, it is possible to expand the window size by the number of connections in a pseudo manner and transfer large quantities of data.

The OS execution control unit 12 denotes a processing unit to control an execution of an OS (Operating System). As an aspect, the OS execution control unit 12 detects an application invocation instruction or a command with respect to an application, from operation information acquired by an operation information acquisition unit 16a which is described later. For example, in the case of detecting a double click or tap on an application icon, the OS execution control unit 12 instruct the app execution control unit 13, which is described later, to invoke an application corresponding to the icon. Also, in the case of detecting an operation screen of the currently invoked application, that is, in the case of detecting an operation to request a command execution on the window, the OS execution control unit 12 instructs the app execution control unit 13 to execute the command. Here, the OS execution control unit 12 can execute an OS of an arbitrary type without depending on a specific architecture. In the following, the application may be referred to as "app".

The app execution control unit 13 denotes a processing unit to control an application execution based on the instruction from the OS execution control unit 12. As an aspect, in a case where an app invocation is instructed by the OS execution control unit 12 or the currently invoked app is instructed to execute a command, the app execution control unit 13 operates the app. Subsequently, the app execution control unit 13 requests the graphic driver 14, which is described later, to render a display image of a processing result acquired by executing the app, to the frame buffer 15. Thus, in the case of giving a rendering request to the graphic driver 14, the app execution control unit 13 reports the display image and a rendering position of the display image to the graphic driver 14.

Also, the app executed by the app execution control unit 13 may be preinstalled or installed after shipping the server apparatus 10. Also, it may be an app operating in a network environment such as JAVA (registered trademark).

The graphic driver 14 denotes a processing unit to perform rendering processing on the frame buffer 15. As an aspect, in the case of accepting the rendering request from the app execution control unit 13, the graphic driver 14 renders, in a bitmap format, the display image of the app processing result to the rendering position designated by the app on the frame buffer 15. Here, although a case is illustrated where the rendering request is accepted via the app, it is possible to accept the rendering request from the OS execution control unit 12. For example, in the case of accepting a mouse cursor rendering request from the OS execution control unit 12, the graphic driver 14 renders, in a bitmap format, a mouse cursor display image to a rendering position designated by the OS on the frame buffer 15.

The frame buffer 15 denotes a storage device to store the bitmap image rendered by the graphic driver 14. Examples of such the frame buffer 15 include a RAM (Random Access Memory) represented by a VRAM (Video Random Access Memory), and a semiconductor memory element such as a ROM (Read Only Memory) and a flash memory. Here, as the frame buffer 15, a storage device such as a hard disk and optical disk may be adopted.

The remote screen control unit 16 denotes a processing unit to provide a remote screen control service to the client terminal 20 through the server-side remote screen control app. As illustrated in FIG. 1, such the remote screen control unit 16 includes an operation information acquisition unit 16a, an update rectangle generation unit 16b, a first compression unit 16c, a division unit 16d, a second compression unit 16e, a header attachment unit 16f and a transmission control unit 16g.

The operation information acquisition unit 16a denotes a processing unit to acquire operation information from the client terminal 20. Examples of such operation information include the right and left clicks, double click and drag by the mouse, the mouse cursor movement amount acquired by mouse movement operations, the mouse wheel rotation amount and a pressed key type in a keyboard. Other examples include a tap coordination position and the flic direction or range on a touch panel of the client terminal 20.

The update rectangle generation unit 16b denotes a processing unit to generate an update rectangle image with reference to the frame buffer 15. As an aspect, the update rectangle generation unit 16b starts up the following processing every frame rate that is an update interval of the desktop, for example, every 33 msec (millisecond). That is, the update rectangle generation unit 16b compares the desktop displayed on the client terminal 20 in the previous frame and the desktop written in the frame buffer 15 in the current frame. Subsequently, the update rectangle generation unit 16b generates an update rectangle image acquired by combining adjacent pixels in a part in which a change is made from the previous frame and forming the result in a rectangular shape. Subsequently, the update rectangle generation unit 16b outputs the identical update rectangle image to both the first compression unit 16c and the second compression unit 16e.

The first compression unit 16c denotes a processing unit to apply a predetermined compression codec and compress the update rectangle image generated in the update rectangle generation unit 16b. By such compression processing, the above high-image-quality screen data is generated. The first compression unit 16c outputs the high-image-quality screen data acquired by the above compression processing to the division unit 16d. Here, as an example of the above compression codec, it is possible to adopt JPEG (Joint Photographic Experts Group) or PNG (Portable Network Graphics).

The division unit 16d denotes a processing unit to divide the high-image-quality screen data generated by the compression coding in the first compression unit 16c into data of a data size within the window size of connection established with the client terminal 20. As an aspect, when accepting the high-image-quality screen data from the first compression unit 16c, the division unit 16d decides whether the high-image-quality screen data is over the window size, for example, "64 Kbyte". Subsequently, in a case where the high-image-quality screen data is over the window size, the division unit 16d divides the high-image-quality screen data such that each divided data is equal to or below the window size. For example, the division unit 16d calculates the division number such that, when the high-image-quality screen data is divided, each division data is below the window size. Subsequently, according to the calculated division number, the division unit 16d divides the high-image-quality screen data into data of a data size equal to or below the window size. After that, the division unit 16d outputs each division data acquired by dividing the high-image-quality screen data to the header attachment unit 16f.

The second compression unit 16e denotes a processing unit to apply a predetermined compression codec and compress the update rectangle image generated by the update rectangle generation unit 16b in a data size within the connection window size. By such compression processing, the above low-image-quality screen data is generated. Here, as an example of the above compression codec, it is possible to apply a lossy compression codec such as JPEG.

Here, the present embodiment exemplifies the case of performing compression such that, when a plurality of update rectangles occur in one frame, the total data size after compression of all update rectangle images is equal to or below the window size. For example, assuming a case where an update rectangle A of "100px*100px" and an update rectangle B of "600px*400px" occur in one frame, an example will be explained where the ratio of the data size of each compressed update rectangle to the window size is determined based on the ratio of the update rectangle areas.

As an aspect, the second compression unit 16e waits until all update rectangles caused in one frame are acquired. Further, when acquiring all update rectangle images, the second compression unit 16e calculates the total value of the sizes of fields forming the update rectangle images, that is, areas. Subsequently, the second compression unit 16e calculates the assignment data amount with respect to each update rectangle according to the ratio of the update rectangle areas. The "assignment data amount" denotes the data amount assigned to each compressed update rectangle data in the window size.

For example, referring to the above example, the total value of field sizes is "100px*100px+600px*400px=250000px." Therefore, the ratio of the assignment data amount to each update rectangle is "1/25" in the update rectangle A and "24/25" in the update rectangle B. The actual assignment data amount depends on the connection window size. For example, when data transmission is performed using one TCP connection, the window size is maximum "64 Kbyte". Therefore, the window size of "64 Kbyte" is assigned based on the area ratio of the update rectangles A and B. That is, the assignment data amount of the update rectangle A is calculated as "64*1/25=2.56 KByte" and the assignment data amount of the update rectangle B is calculated as "64*24/25=61.44 Kbyte."

After that, the second compression unit 16e decides whether the assignment data amount to each update rectangle is equal to or less than a predetermined threshold. As such the threshold, the data amount of compression data per certain area, for example, "2 Kbyte per 10000 px" is set. At this time, when there is an update rectangle of the assignment data amount equal to or less than the threshold, the second compression unit 16e performs subtractive color processing for color subtraction from the 24-bit color, called "full color", to the 16-bit or 8-bit color or down-sampling processing, or performs compression rate increase processing including these two processings. By this means, it is intended to not only apply a compression coding scheme such as JPEG but also further reduce the data amount. Here, referring to the above example, assignment of "2.56 Kbyte per 100000 px" is performed and therefore the subtractive color processing and the down-sampling processing are not performed. Subsequently, the second compression unit 16e compresses the update rectangle image within the data amount assigned to each update rectangle image. After that, the second compression unit 16e outputs the low-image-quality screen data acquired by the compression processing to the header attachment unit 16f.

Here, although a case is illustrated where the ratio of the data size of each compressed update rectangle to the window size is determined based on the ratio of the areas of the update rectangles, the second compression unit 16e is not limited to this.

The header attachment unit 16f denotes a processing unit to attach header information to the division data of the high-image-quality screen data and the low-image-quality screen data. Here, the "header information" includes the data image quality type, frame number, field size, position, packet number, division packet number and end flag. Among these, the "data image quality type" denotes a code indicating whether the screen data is the high-image-quality screen data or the screen data is the low-image-quality screen data. Also, the "frame number" denotes a number to identify a frame of the desktop. Also, the "field size" denotes the area or the height and width of the high-image-quality screen data or the low-image-quality screen data. Also, the "position" denotes the coordinate of a predetermined position of the high-image-quality screen data or the low-image-quality screen data, for example, denotes the coordinate of the vertex or median point forming the update rectangle image. Also, the "packet number" denotes a number to identify a packet and includes, for example, a packet sequence number. Also, the "division packet number" denotes a number to identify division data. Also, the "end flag" denotes a flag indicating the end of division data and is assigned to division data of the highest division packet number among division data, so as to detect that reception of the division data ends on the side of the client terminal 20, for example.

As an aspect, when the low-image-quality screen data is input from the second compression unit 16e, the header attachment unit 16f attaches, to the low-image-quality screen data, header information including the data image quality type, frame number, field size, position and packet number. At this time, a code indicating the "low-image-quality screen data" is attached to the data image quality type. Also, the division packet number and the end flag are not attached to the low-image-quality screen data. Meanwhile, when division data of the high-image-quality screen data is input from the division unit 16d, the header attachment unit 16f attaches, to the division data of the high-image-quality screen data, header information including the data image quality type, frame number, field size, position, packet number, division packet number and end flag. At this time, a code indicating the "high-image-quality screen data" is attached to the data image quality type. Also, the end flag is attached only to division data of the highest division packet number. After that, the header attachment unit 16f outputs the division data of the high-image-quality screen data and the low-image-quality screen data, to which the header information is attached, to the transmission control unit 16g.

The transmission control unit 16g denotes a processing unit to perform data transmission control with respect to the client terminal 20. As an aspect, the transmission control unit 16g assigns the division data of the high-image-quality screen data to any connection of the multiple connections and assigns the low-image-quality screen data to the dedicated connection.

To be more specific, when accepting screen data from the header attachment unit 16f, the transmission control unit 16g decides whether the screen data is the high-image-quality screen data. At this time, when the screen data is the high-image-quality screen data, the transmission control unit 16g selects one connection of the multiple connections. For example, the transmission control unit 16g selects a different connection every time division data is accepted, so as to prevent a transmission data amount gap between connections from being caused. Also, the transmission control unit 16g can select one connection from the multiple connections at random. Meanwhile, when the screen data is the low-image-quality screen data, the transmission control unit 16g selects the dedicated connection. After that, the transmission control unit 16g outputs the image data to the above selected connection. By this means, the division data of the high-image-quality screen data and the low-quality screen data are transmitted to the client terminal 20.

Also, the OS execution control unit 12, the app execution control unit 13, the graphic driver 14 and the remote screen control unit 16 can adopt various integrated circuits and electronic circuits. Also, part of the function units included in the remote screen control unit 16 can be replaced with another integrated circuit or electronic circuit. For example, as the integrated circuit, there is an ASIC (Application Specific Integrated Circuit), FPGA (Field Programmable Gate Array) and so on. Also, as the electronic circuit, there is a CPU (Central Processing Unit), MPU (Micro Processing Unit) and so on.

Configuration of Client Terminal 20

Next, a functional configuration of the client terminal according to the present embodiment will be explained. As illustrated in FIG. 1, the client terminal 20 includes an input unit 21, a display unit 22, a communication I/F unit 23 and a client-side remote screen control unit 25. Also, in addition to the function units illustrated in FIG. 1, the client terminal 20 may include various function units held by a known computer, for example, function units including a sound device such as a sound input unit and sound output unit, a camera and various sensors.

The input unit 21 denotes an input device to accept various kinds of information such as an instruction input with respect to the client-side remote screen control unit 25 which is described later. As an example, it is possible to adopt a keyboard, a mouse or the like. Thus, in a case where the mouse is adopted, it is possible to realize a pointing device function by cooperating with the display unit 22 which is described later. As another example, it is possible to cause the input unit 21 to function as a touch panel by cooperating with the display unit 22 which is described later.

The display unit 22 denotes a display unit to display various kinds of information such as the desktop transmitted from the server apparatus 10, and, as an example, it is possible to apply a monitor, display, touch panel and so on. Also, the display unit 22 displays a bitmap image rendered by a frame buffer 27 which is described later.

The communication I/F unit 23 denotes an interface to perform communication control with another apparatus such as the server apparatus 10. As an aspect of such the communication I/F unit 23, it is possible to adopt a network interface card such as a LAN card. For example, the communication I/F unit 23 establishes and maintains the multiple connections with the communication I/F unit 11 of the server apparatus 10. Thus, under an environment in which the multiple connections are maintained, the communication I/F unit 23 receives the low-image-quality screen data or the division data of the high-image-quality screen data from the server apparatus 10.

The remote screen control unit 25 denotes a processing unit to get the provision of remote screen control services by the server apparatus 10 via the client-side remote screen control app. As illustrated in FIG. 1, this remote screen control unit 25 includes an operation information report unit 25a, a reception control unit 25b and a priority display determination unit 25c.

The operation information report unit 25a denotes a processing unit to report operation information by the input unit 21 to the server apparatus 10. As an aspect, the operation information report unit 25a reports, as the operation information, the right and left clicks, double click and drag by the mouse, the mouse cursor movement amount acquired by mouse movement operations, the mouse wheel rotation amount and a pressed key type in a keyboard. As another example, the tap coordinate position or the flic direction or range on the touch panel are reported as operation information.

The reception control unit 25b denotes a processing unit to perform reception control of data from the server apparatus 10. As an aspect, the reception control unit 25b outputs screen data received from the communication I/F unit 23, to the priority display determination unit 25c which is described later. At this time, regarding the high-image-quality screen data, the division data is received via the multiple connections. Therefore, the reception control unit 25b combines the division data and subsequently outputs the result to the priority display determination unit 25c.

To be more specific, the reception control unit 25b refers to the header information attached to the screen data received from the communication I/F unit 23. At this time, when the code indicating the data image quality type in the header information is the "high-image-quality screen data", the reception control unit 25b further decides whether the end flag is written in the header information. Further, when the end flag is written in the header information, the reception control unit 25b generates the high-image-quality screen data by integrating each division data according to the order of division packet number. Subsequently, the reception control unit 25b outputs the high-image-quality screen data to the priority display determination unit 25c which is described later. Here, when the code indicating the data image quality type included in the header information is the "low-image-quality screen data", the low-image-quality screen data is output as is to the priority display determination unit 25c which is described later.

The priority display determination unit 25c denotes a processing unit to determine screen data to be preferentially displayed among the low-image-quality screen data and the high-image-quality screen data. As an aspect, the priority display determination unit 25c checks the frame number and the image quality type of the screen data received from the reception control unit 25b. Further, when accepting the latest high-image-quality screen data within a predetermined time such as 33 msec corresponding to one frame, the priority display determination unit 25c outputs the high-image-quality screen data to a graphic driver 26 which is described later. Meanwhile, when the high-image-quality screen data is not reached in the predetermined time and only the low-quality-screen image data is accepted, the priority display determination unit 25c outputs the low-image-quality screen data to the graphic driver 26.

To be more specific, when receiving screen data from the reception control unit 25b, the priority display determination unit 25c decides whether the data screen type in the header information attached to the screen data is the "high-image-quality screen data". At this time, when the data image quality type is the high-image-quality screen data, the priority display determination unit 25c further compares the frame number included in the header information and a planned rendering frame number held in an internal memory which is not illustrated. Here, the "planned rendering frame number" denotes the frame number to be rendered to the frame buffer 27 which is described later. Such the planned rendering frame number is updated by incrementing the number when all image data having the identical frame number, that is, the low-image-quality screen data or the high-image-quality screen data is reflected to the frame buffer 27 which is described later. For example, the planned rendering frame number is updated to "3" after the frame having a frame number of "2" is rendered.

Here, when the planned rendering frame number is identical to the frame number of the high-image-quality screen data or the number incrementing the frame number of the high-image-quality screen data by one, the priority display determination unit 25c causes the graphic driver 26 to reflect the high-image-quality screen data to the frame buffer 27. This assumes a case where, when the high-image-quality screen data is reached before the low-image-quality screen data or the low-image-quality screen data is rendered, the low-image-quality screen data is overwritten with the high-image-quality screen data. Meanwhile, when the planned rendering frame number is not identical to the frame number of the high-image-quality screen data and the number incrementing the frame number of the high-image-quality screen data by one, the priority display determination unit 25c discards the high-image-quality screen data without being rendered.

Also, when the data image quality type is the "low-image-quality screen data", the priority display determination unit 25c waits for a predetermined period until the high-image-quality screen data is received. By this means, the high-image-quality screen data is waited within a range in which the rendering delay is not caused. Subsequently, the priority display determination unit 25c further compares the frame number included in the header information of the low-image-quality screen data and the planned rendering frame number held in the internal memory which is not illustrated. At this time, when the planned rendering frame number is identical to the frame number of the low-image-quality screen data, the priority display determination unit 25c causes the graphic driver 26 to reflect the low-image-quality screen data to the frame buffer 27. This assumes a state where, only when the high-image-quality screen data is not rendered a predetermined period after, for example, 33 msec after, the low-image-quality screen data is rendered. Meanwhile, when the planned rendering frame number is not identical to the frame number of the low-image-quality screen data, the priority display determination unit 25c discards the low-image-quality screen data without being rendered.

The graphic driver 26 denotes a processing unit to perform rendering processing with respect to the frame buffer 27. As an aspect, when accepting a rendering instruction from the priority display determination unit 25c, the graphic driver 26 renders image data in a bitmap format to a rendering position, which is designated by the position included in the header information of the image data, on the frame buffer 27.

The frame buffer 27 denotes a storage device to store the bitmap image rendered by the graphic driver 26. As an aspect of such the frame buffer 27, there are a RAM represented by a VRAM, a semiconductor memory element such as a ROM and flash memory. Also, as the frame buffer 27, it is possible to adopt a storage device such as a hard disk and an optical disk.

Also, as the client-side remote screen control unit 25, it is possible to adopt various integrated circuits and electronic circuits. Also, part of the function units included in the remote screen control unit 25 can be replaced with another integrated circuit or electronic circuit. For example, as the integrated circuit, there is an ASIC, FPGA and so on. Also, as the electronic circuit, there is a CPU, MPU and so on.

Flow of Processing

Next, a flow of processing in the thin client system according to the present embodiment will be explained. In the following, (1) the overall processing performed by the server apparatus 10 is explained first, (2) division processing, (3) second compression processing and (4) transmission control processing are explained in order, and, finally, (5) priority display determination processing performed by the client terminal 20 is explained.

(1) Overall Processing

Figure 3:
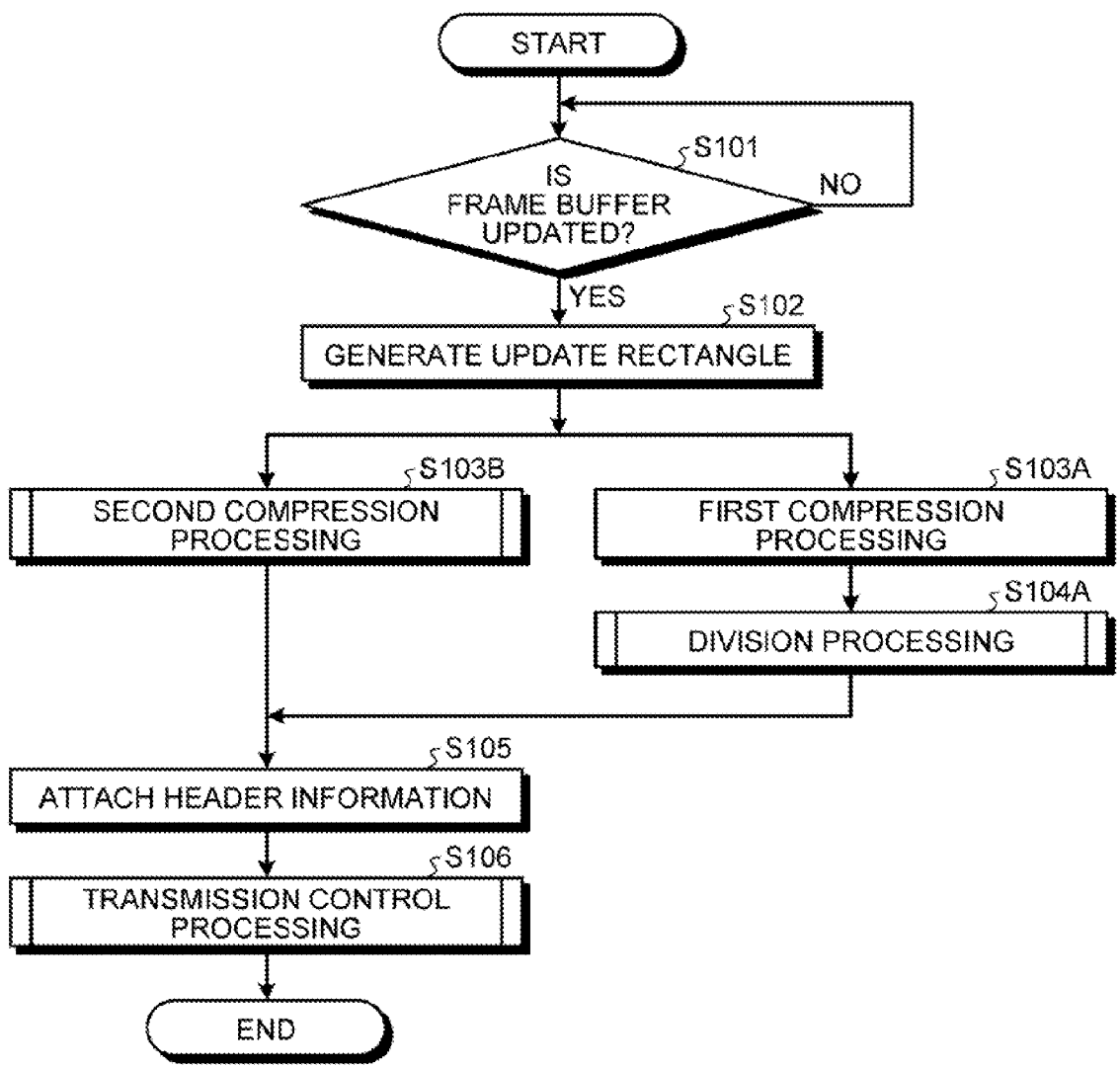
FIG. 3 is a flowchart illustrating the steps of the overall processing performed by a server apparatus according to the first embodiment.

FIG. 3 is a flowchart illustrating the steps of the overall processing performed by the server apparatus 10 according to the first embodiment. This overall processing is processing that is repeatedly performed as long as the multiple connections are established between the server apparatus 10 and the client terminal 20.

As illustrated in FIG. 3, when the desktop stored in the frame buffer 15 is updated (Yes in step S101), the update rectangle generation unit 16b generates an update rectangle image by combining adjacent differences in pixels of a part in which a change is made from the previous frame and forming the result in a rectangular shape (step S102).

Subsequently, using a predetermined compression codec, the first compression unit 16c performs first compression processing of compressing the update rectangle image generated by the update rectangle generation unit 16b (step S103A).

Subsequently, the division unit 16d divides the high-image-quality screen data generated by the compression coding in the first compression unit 16c, into data of a data size within the window size of connection established with the client terminal 20 (step S104A).

Meanwhile, using a predetermined compression codec, the second compression unit 16e performs second compression processing of compressing the update rectangle image generated by the update rectangle generation unit 16b, to a data size within the connection window size (step S103B).

After that, the header attachment unit 16f attaches header information to the division data acquired by dividing the high-image-quality screen data in the division unit 16d and the low-image-quality screen data generated by the compression coding in the second compression unit 16e (step S105).

Subsequently, the transmission control unit 16g performs transmission control processing of assigning the division data of the high-image-quality screen data to any connection of the multiple connections and assigning the low-image-quality screen data to the dedicated connection (step S106).

The processing in these steps S101 to S106 is repeatedly performed as long as the multiple connections are established between the server apparatus 10 and the client terminal 20.

Here, in the flowchart illustrated in FIG. 3, the processing in steps S103A and S104A and the processing in step S103B can be performed in parallel or any of these can be performed earlier or later.

(2) Division Processing

Figure 4:
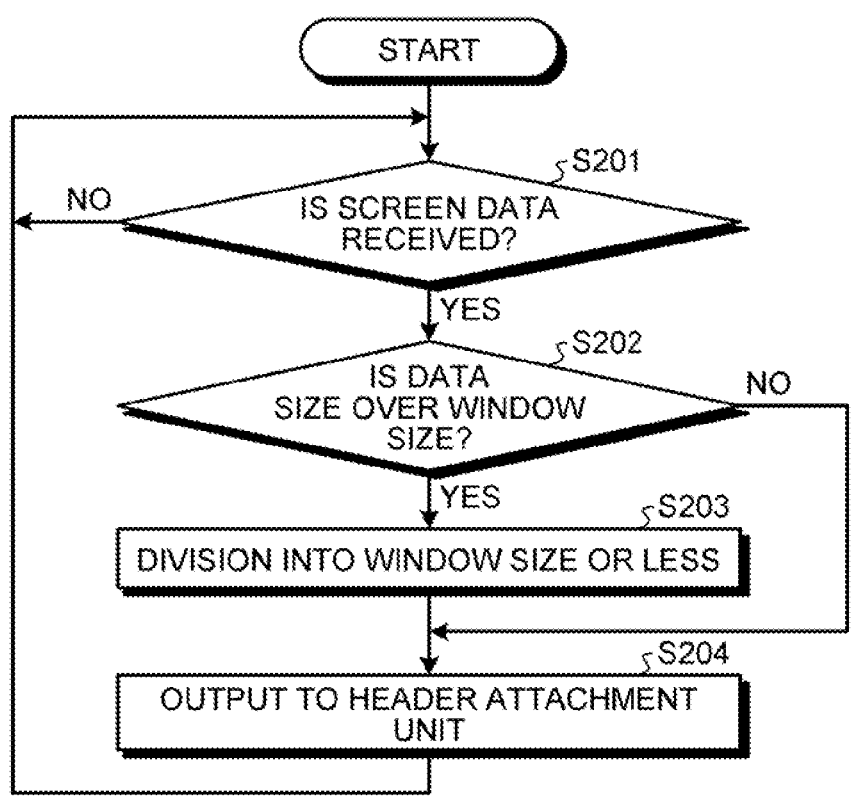
FIG. 4 is a flowchart illustrating the steps of division processing according to the first embodiment.

FIG. 4 is a flowchart illustrating the steps of division processing according to the first embodiment. This division processing denotes processing corresponding to step S104A illustrated in FIG. 3. As illustrated in FIG. 4, when receiving the high-image-quality screen data from the first compression unit 16c (Yes in step S201), the division unit 16d decides whether the high-image-quality screen data is over the window size, for example, "64 KByte" (step S202).

Subsequently, when the high-image-quality screen data is over the window size (Yes in step S202), the division unit 16d divides the high-image-quality screen data such that each divided data is equal to or below the window size (step S203). After that, the division unit 16d outputs each division data acquired by dividing the high-image-quality screen data, to the header attachment unit 16f (step S204).

Meanwhile, when the high-image-quality screen data is equal to or below the window size (No in step S202), the division unit 16d outputs the high-image-quality screen data as is to the header attachment unit 16f without dividing the high-image-quality screen data (step S204).

Second Compression Processing

Figure 5:
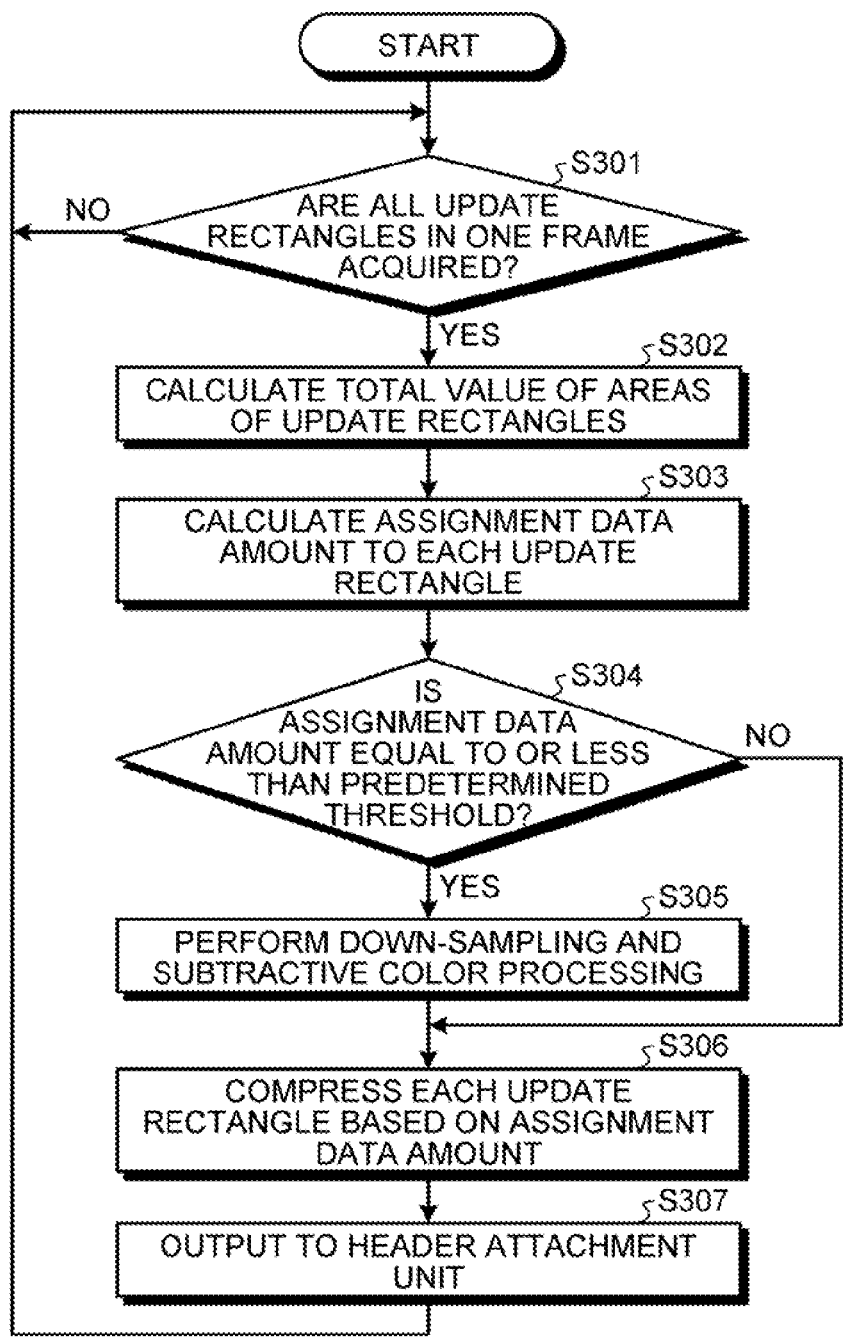
FIG. 5 is a flowchart illustrating the steps of second compression processing according to the first embodiment.

FIG. 5 is a flowchart illustrating the steps of compression processing according to the first embodiment. This second compression processing is processing corresponding to step S103B illustrated in FIG. 3. As illustrated in FIG. 5, the second compression unit 16e stands ready for the following processing until all update rectangles caused in one frame are acquired (No in step S301).

Subsequently, when all update rectangle images are acquired (Yes in step S301), the second compression unit 16e calculates the total value of the sizes of fields forming the update rectangle images, that is, areas (step S302). Subsequently, the second compression unit 16e calculates the assignment data amount with respect to each update rectangle according to the ratio of the update rectangle areas (step S303).

After that, the second compression unit 16e decides whether the assignment data amount of each update rectangle is equal to or less than a predetermined threshold (step S304). At this time, when there is an update rectangle of the assignment data amount equal to or less than the threshold (Yes in step S304), the second compression unit 16e performs the following processing. That is, the second compression unit 16e performs subtractive color processing for color subtraction from the 24-bit color, called "full color", to the 16-bit or 8-bit color or down-sampling processing, or performs compression rate increase processing including these two processings (step S305).

Meanwhile, when the assignment data amount of each update rectangle is over a predetermined threshold (No in step S304), it proceeds to step S306 without performing the subtractive color processing or the down-sampling processing.

After that, the second compression unit 16e compresses the update rectangle image within the data amount assigned to each update rectangle image (step S306). Subsequently, the second compression unit 16e outputs the low-image-quality screen data acquired by the compression processing to the header attachment unit 16f (step S307).

(4) Transmission Control Processing

Figure 6:
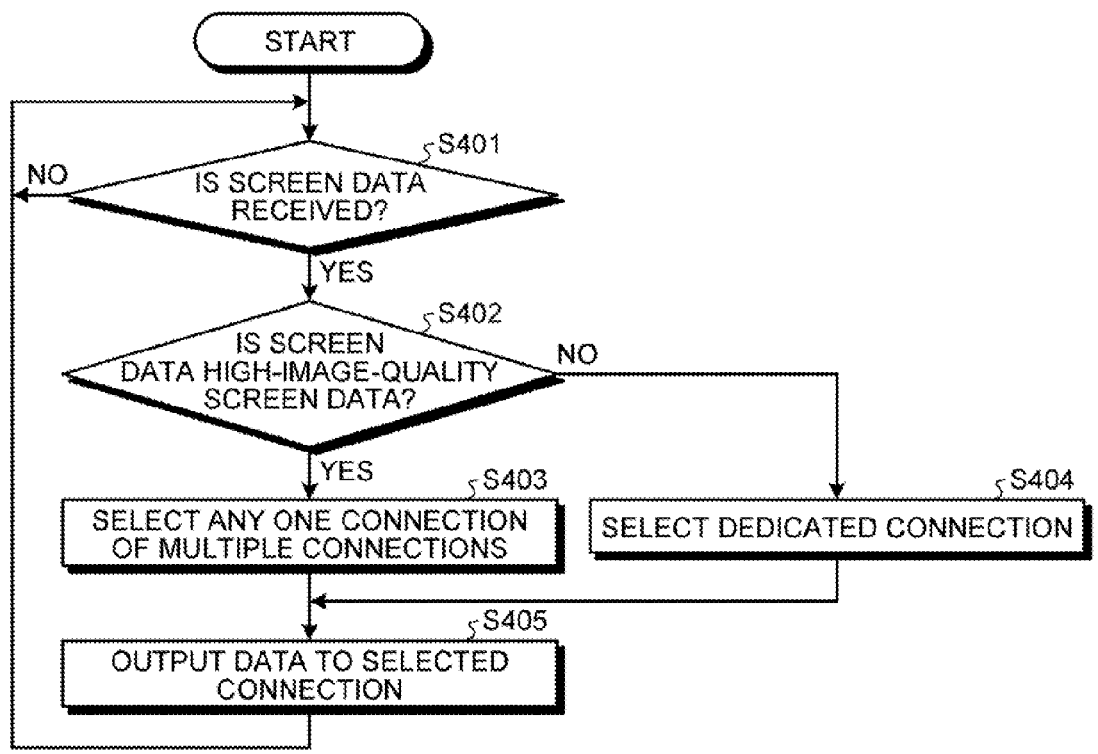
FIG. 6 is a flowchart illustrating the steps of transmission control processing according to the first embodiment.

FIG. 6 is a flowchart illustrating the steps of transmission control processing according to the first embodiment. This transmission control processing denotes processing corresponding to step S106 illustrated in FIG. 3. As illustrated in FIG. 6, when receiving screen data from the header attachment unit 16f (Yes in step S401), the transmission control unit 16g decides whether the screen data is the high-image-quality screen data (step S402).

At this time, when the screen data is the high-image-quality screen data (Yes in step S402), the transmission control unit 16g selects any one connection of the multiple connections (step S403). Meanwhile, when the screen data is the low-image-quality screen data (No in step S402), the transmission control unit 16g selects the dedicated connection (step S404).

After that, the transmission control unit 16g outputs the screen data to the connection selected in step S403 or S404 (step S405). By this means, the division data of the high-image-quality screen data or the low-quality screen data is transmitted to the client terminal 20.

(5) Priority Display Determination Processing

Figure 7:
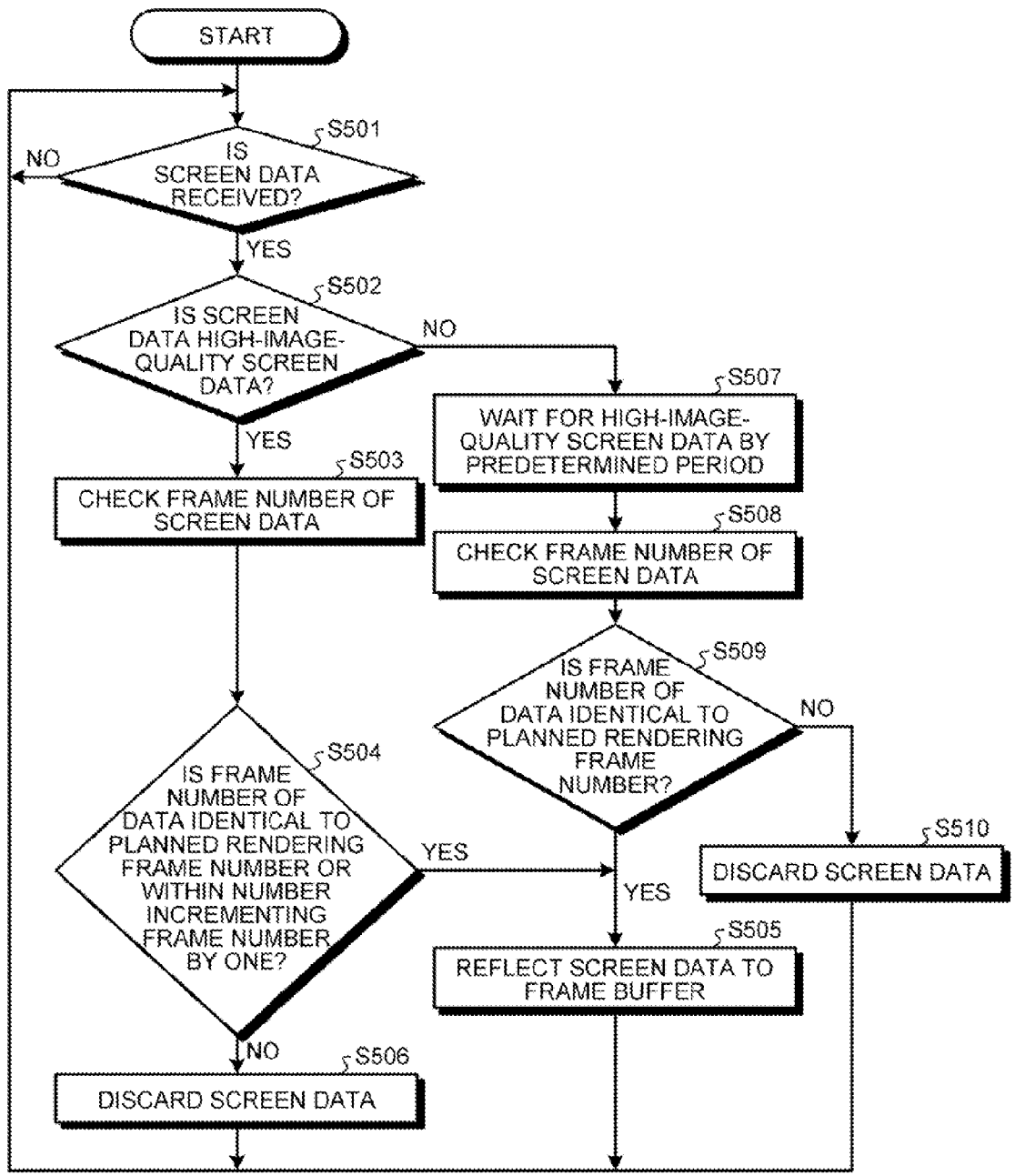
FIG. 7 is a flowchart illustrating the steps of priority display determination processing according to the first embodiment.

FIG. 7 is a flowchart illustrating the steps of priority display determination processing according to the first embodiment. This priority display determination processing is processing that is repeatedly performed as long as the multiple connections are established between the server apparatus 10 and the client terminal 20.

As illustrated in FIG. 7, when receiving screen data from the reception control unit 25b (Yes in step S501), the priority display determination unit 25c decides whether the data image quality type in header information attached to the screen data is the "high-image-quality screen data" (step S502).

At this time, when the data image quality type is the high-image-quality screen data (Yes in step S502), the priority display determination unit 25c further compares the frame number included in the header information and a planned rendering frame number held in the internal memory which is not illustrated (step S503).

Here, when the planned rendering frame number is identical to the frame number of the high-image-quality screen data or the number incrementing the frame number of the high-image-quality screen data by one (Yes in step S504), the priority display determination unit 25c causes the graphic driver 26 to reflect the high-image-quality screen data to the frame buffer 27 (step S505).

Meanwhile, when the planned rendering frame number is not identical to the frame number of the high-image-quality screen data and the number incrementing the frame number of the high-image-quality screen data by one (No in step S504), the priority display determination unit 25c discards the high-image-quality screen data without being rendered (step S506).

Also, when the data image quality type is the "low-image-quality screen data" (No in step S502), the priority display determination unit 25c waits for a predetermined period until the high-image-quality screen data is accepted (step S507).

Subsequently, the priority display determination unit 25c further compares the frame number included in the header information of the low-image-quality screen data and the planned rendering frame number held in the internal memory which is not illustrated (step S508).

At this time, when the planned rendering frame number is identical to the frame number of the low-image-quality screen data (Yes in step S509), the priority display determination unit 25c causes the graphic driver 26 to reflect the low-image-quality screen data to the frame buffer 27 (step S505).

Meanwhile, when the planned rendering frame number is not identical to the frame number of the low-image-quality screen data (No in step S509), the priority display determination unit 25c discards the low-image-quality screen data without being rendered (step S510).

Advantage of First Embodiment

As described above, by using the multiple connections, the server apparatus 10 according to the present embodiment improves the data transmission amount on a network in which the delay or the packet loss rate is large. Further, the server apparatus 10 according to the present embodiment divides and transmits the high-image-quality screen data to the multiple connections and transmits the low-image-quality screen data by the dedicated connection. Therefore, with the server apparatus 10 according to the present embodiment, it is possible to suppress the image degradation and transmission delay without depending on a specific codec.

[b] Second Embodiment

Although an embodiment related to the disclosed apparatus has been described above, the present invention may be implemented in various formats in addition to the above embodiment. Therefore, in the following, other embodiments included in the present invention will be explained.

Application Example 1

For example, the disclosed apparatus may compress an update field image based on a connection window size acquired every predetermined period. For example, the window size used in the communication I/F unit 11 of the server apparatus 10 is acquired and used as the assignment data amount used in the second compression unit 16e. By this means, the low-image-quality screen data that can be transmitted more accurately by one connection at one time may be generated.

That is, in above the first embodiment, a case has been described where "64 Kbyte" as the maximum TCP window size is used as the assignment data amount used in the second compression unit 16e. However, in an actual communication environment, it is unusual that the window size is constant, and the window size constantly varies. Therefore, when a fixed assignment size is used, there may occur a difference between the actual window size and the data size of the low-image-quality screen data, and a case may occur where all screen data is not transmitted at one time.

From this, in the disclosed apparatus, the window size currently used in the communication I/F unit 11 is acquired and used as the assignment data amount of the second compression unit 16e. By this means, it is possible to generate the more accurate low-image-quality screen data in which a difference from the actual window size is suppressed as much as possible. For example, the disclosed apparatus acquires all connection window sizes at one time every one second and uses the minimum value among these as the assignment data amount. By this means, even in a case where the communication environment degrades and the window size varies, there is a high possibility that the lower-image-quality screen data reaches the client terminal 20 quickly.

Application Example 2

Also, the disclosed apparatus can select a connection to which division data of high-image-quality screen data is assigned, in response to a progress state of the data transmission in each connection. For example, the communication state of each connection used in the transmission control unit 16g of the server apparatus 10 is detected, and, upon connection selection at the time of transmission of the high-image-quality screen data, it may be possible to select a connection in which data transmission is already finished or the data transmission is the closest to the end.

That is, in above the first embodiment, connections used when transmitting divided high-image-quality screen data are sequentially switched and used. However, it is not limited that transmission is finished at identical time intervals in the connections, and, depending on the situation, there is a case where transmission by a connection in which the transmission was started later is finished earlier and therefore efficient transmission is not possible.

From this, the disclosed apparatus detects the communication state of each connection in the transmission control unit 16g and selects a connection in which data transmission is already finished or the data transmission is the closest to the end, at the time of transmission of high-image-quality screen data. By this means, at the time of data transmission, it is possible to transmit the data in a connection in which the transmission is possible most quickly. For example, the disclosed apparatus creates and manages a transmission connection candidate queue with respect to the multiple connections for the high-image-quality screen data. The communication state of each connection is checked every certain interval and the queue order is updated at that time. The queue order is sorted in order from a transmission end connection, ACK waiting connection to connection in which transmission is currently performed. Subsequently, the disclosed apparatus may assign the high-image-quality screen data to the transmission end connection, the ACK waiting connection to the connection in which transmission is currently performed.

Application Example 3

For example, the disclosed apparatus may establish a plurality of dedicated connections with the client terminal 20 and assign low-image-quality screen data compressed in a data size within the window size, to each dedicated connection. Thus, by increasing the number of paths to transmit the low-image-quality screen data, it is possible to increase the possibility that the low-image-quality screen data reaches the client terminal 20 without packet loss.

Application Example 4

Also, the disclosed apparatus can arrange a data transmission order such that the low-image-quality data is preferentially transmitted. For example, the image quality type and frame number of data reported in the transmission control unit 16g of the server apparatus 10 may be checked to transmit the low-image-quality data in priority to divided high-image-quality data in a certain frame.

That is, in above the first embodiment, the transmission order of the divided high-image-quality data and the low-image-quality data is not defined, and therefore a case is assumed where the low-image-quality data is transmitted after the divided high-image-quality data. However, there are many cases where an available band is less in a communication path of large RTT, and, in this case, all data is not transmitted by the time the next frame is generated. As a result, transmission of both the low-image-quality data and the high-image-quality data is delayed and the rendering delay is caused in the client.

From this, the disclosed apparatus transmits low-image-quality data in one frame before divided high-image-quality data in the transmission control unit 16g. When the processing unit receives the divided high-image-quality data earlier, transmission of this is deferred, and, after the low-image-quality data is received and transmitted, the transmission is performed.

Application Example 5

Although above the first embodiment exemplifies a case where the ratio of the data size of each compressed update rectangle to the window size is determined based on the ratio of the areas of the update rectangles, the disclosed apparatus is not limited to this. As an example, the disclosed apparatus may regard a field image containing all update rectangles as one update rectangle and perform compression such that the data size of the update rectangle image is equal to or less than the window size. For example, the update rectangle generation unit 16b generates one update rectangle containing all update rectangles and outputs it to the second compression unit 16e. Subsequently, the second compression unit 16e compresses the one update rectangle output from the update rectangle generation unit 16b to the window size or less. By this means, it is possible to generate low-image-quality screen data form one update rectangle.

Distribution and Integration

Also, each illustrated component of each device is not always requested to be physically configured as illustrated in the drawings. That is, the specific form of distribution/integration in each device is not limited to what is illustrated in the drawings. That is, depending on various loads or a use status, it is possible to form them by functionally or physically distributing or integrating all or part of them in an arbitrary unit.

Image Transmission Program

Also, various kinds of processing explained in the above embodiments can be realized by executing a prepared program on a computer such as a personal computer and workstation. Therefore, in the following, an example of a computer that executes an image transmission program to realize the same functions as in the above embodiments will be explained.

Figure 8:
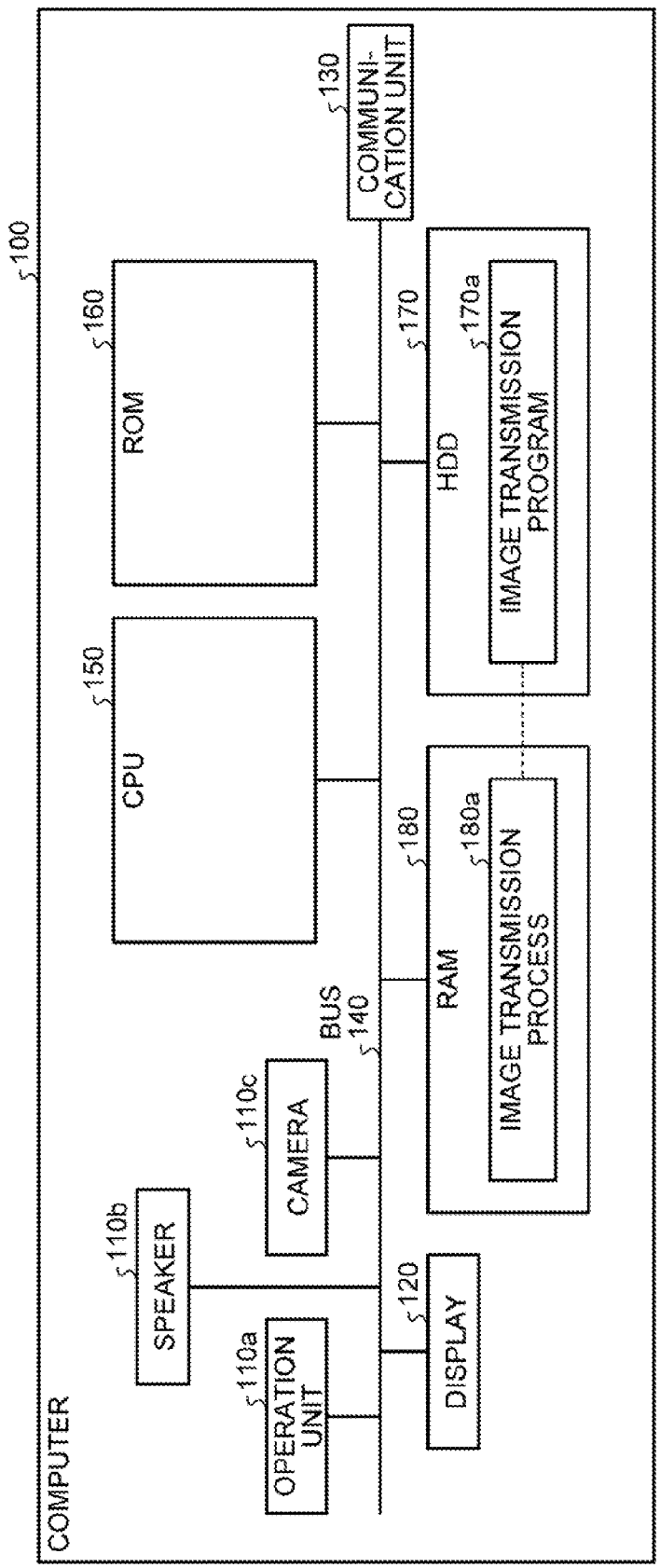
FIG. 8 is a view for explaining an example of a computer that executes an image transmission program according to the first embodiment and a second embodiment.

FIG. 8 is a view for explaining an example of a computer that executes an image transmission program according to the first and the second embodiments. As illustrated in FIG. 8, a computer 100 includes an operation unit 110a, a speaker 110b, a camera 110c, a display 120 and a communication unit 130. Further, this computer 100 includes a CPU 150, a ROM 160, a HDD 170 and a RAM 180. These units 110 to 180 are connected via a bus 140.

As illustrated in FIG. 8, the HDD 170 stores in advance an image transmission program 170a to fulfill the same function as the remote screen control unit 16 illustrated in above the first embodiment. Regarding this image transmission program 170a, similar to each component of the remote screen control unit 16 illustrated in FIG. 1, integration or distribution may be adequately performed. Namely, all data illustrated as stored in the HDD 170 does not always have to be stored in the HDD 170, and it is sufficient if data for each process is stored in the HDD 170.

Subsequently, the CPU 150 reads the image transmission program 170a from the HDD 170 and develops it on the RAM 180. By this means, as illustrated in FIG. 8, the image transmission program 170a functions as an image transmission process 180a. This image transmission process 180a adequately develops various kinds of data read from the HDD 170, on a field assigned to the RAM 180 itself, and performs various kinds of processing based on these various kinds of developed data. Also, the image transmission process 180a includes the processing performed by the remote screen control unit 16 illustrated in FIG. 1, for example, the processing illustrated in FIG. 3 to FIG. 7. Furthermore, all the processing units illustrated as virtually realized on the CPU 150 do not always have to operate on the CPU 150, and it is sufficient if a processing unit for each process is virtually realized.

Incidentally, the image transmission program 170a does not always have to be stored in the HDD 170 or the ROM 160 from the beginning. For example, each program is stored in a "portable physical medium" such as a flexible disk, which is also called FD, CD-ROM, DVD disk, magnetic optical disk and IC card, which is inserted into the computer 100. Subsequently, the computer 100 may acquire each program from these portable physical media and execute it. Also, each program may be stored in another computer or server apparatus connected to the computer 100 via the public line, Internet, LAN and WAN, and the computer 100 may acquire each program from these and execute it.

According to an aspect of the information processing apparatus disclosed in the present application, it is possible to provide an advantage of being able to suppress the transmission delay without depending on a specific codec.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   an image memory that stores an image to be displayed on a terminal apparatus that is connected through a network; and
   a processor coupled to the image memory, wherein the processor executes a process comprising:
      rendering a software processing result to the image memory;
      detecting an update field in which the image is updated, when the rendering with respect to the image memory is performed;
      first compressing the image of the update field to obtain first compression data;

dividing the first compression data into a data size within a window size that is determined according with a buffer size of the terminal apparatus of a connection in which a flow control is performed using a buffer of the terminal apparatus to obtain division data;

second compressing the image of the update field to the data size within the window size of the connection to obtain second compression data; and assigning each division data to any connection of multiple connections and assigning the second compression data to a dedicated connection different from the multiple connections.

2. The information processing apparatus according to claim 1, wherein the process further comprises: acquiring the window size of connection every predetermined period, and the second compressing includes compressing the image of the update field based on the connection window size.

3. The information processing apparatus according to claim 1, wherein the assigning includes selecting a connection to which the division data is assigned, based on a progress state of data transmission in each connection.

4. The information processing apparatus according to claim 1, wherein:

the assigning includes assigning the second compression data to each of dedicated connections.

5. An image transmission method comprising:

rendering a software processing result to an image memory that stores an image to be displayed on a terminal apparatus connected through a network;

detecting an update field in which the image is updated, when the rendering with respect to the image memory is performed;

first compressing the image of the update field to obtain first compression data;

dividing the first compression data into a data size within a window size that is determined according with a buffer size of the terminal apparatus of a connection in which a flow control is performed using a buffer of the terminal apparatus to obtain division data;

second compressing the image of the update field to the data size within the window size of the connection to obtain second compression data; and assigning each division data to any connection of multiple connections and assigning the second compression data to a dedicated connection different from the multiple connections.

6. A non-transitory computer readable recording medium having stored therein an image transmission program causing a computer to execute a process comprising:

rendering a software processing result to an image memory that stores a image to be displayed on a terminal apparatus connected through a network;

detecting an update field in which the image is updated, when the rendering with respect to the image memory is performed;

first compressing the image of the update field to obtain first compression data;

dividing the first compression data into a data size within a window size that is determined according with a buffer size of the terminal apparatus of a connection in which a flow control is performed using a buffer of the terminal apparatus to obtain division data;

second compressing the image of the update field to the data size within the window size of the connection to obtain second compression data; and assigning each division data to any connection of multiple connections and assigning the second compression data to a dedicated connection different from the multiple connections.

* * * * *